Feb. 17, 1970  D. J. YEAGER ET AL  3,495,669
FORCE AND PRESSURE MEASUREMENT SYSTEMS
Filed Aug. 26, 1966  2 Sheets-Sheet 1

INVENTORS
Dallas J. Yeager,
Donald R. Rister

BY

*Charles A. Phillips*
ATTORNEY

INVENTORS
Dallas J. Yeager,
Donald R. Rister

BY
*Charles G. Phillips*
ATTORNEY

United States Patent Office 3,495,669
Patented Feb. 17, 1970

3,495,669
FORCE AND PRESSURE MEASUREMENT SYSTEMS
Dallas J. Yeager and Donald R. Rister, Huntsville, Ala., assignors, by mesne assignments, to Ametek, Inc., New York, N.Y., a corporation of Delaware
Filed Aug. 26, 1966, Ser. No. 575,320
Int. Cl. G01g 1/24, 5/04
U.S. Cl. 177—194
12 Claims

ABSTRACT OF THE DISCLOSURE

A balance beam of inverted channel shape pivotally supported intermediate its ends provides one arm for tare or other weight support and a second arm pivotally supporting a load supporting platform, integral flexure connections of the beam to a fixed support portion and to the platform affording the pivotal supports therebetween; while a U-shaped stabilizer is connected between the platform and main support to form a parallelogram type pivotal linkage with the second arm, the pivots similarly being integral flexure connections. Means for applying standard weights to the platform and a hydraulic coupling to apply weight opposing force through a rotationally driven minimum friction piston, balance point sensing means controlling air pressure applied to the hydraulic fluid establishing the counterbalancing hydraulic pressure, afford a deadweight type apparatus with an applied air output as a calibrated pressure source. Strain gauge means on the beam-supporting flexural pivot may be used for balance point sensing and/or for visual read out of amplified strain gauge signals in weighing or force measurement.

---

This invention relates to force or weight measuring systems and particularly to new systems of weighing and to systems wherein deadweight is used to provide a primary standard of measurement.

For some time there has existed the need for faster, more accurate, and wider range weight and force measurement equipment and particularly for pressure measurement equipment having these attributes.

Accordingly, the object of this invention is to provide an improved force or weight measurement system and particularly to provide an improved system for the rapid and precise measurement of weights and pressures.

In accordance with one aspect of this invention a pressure or weight measurement system is constructed employing a weight balancing arm supported by a unique pivot; and in one form of the system, pivot strain is electrically sensed to provide a weight readout or control signal.

In accordance with a second aspect of the invention a new and improved weight or deadweight platform is connected to one side or section of the balancing arm. This deadweight platform includes a stabilizing system to restrict movement of the platform to a vertical line of direction despite movement of the weight balance arm through its normal circular path as, during a weighing cycle, the arm swings above and below its balance point before coming to rest at balance. As a special feature of the invention, vertical stabilization is achieved by means of a plurality of pivots or other forms of rotary couplings and connecting linkages forming a parallelogram. By vertical stabilization the deadweight platform in a given operation always applies the same effective weight to the balance arm, irrespective of the angle of the latter, at the same distance from the balance arm pivot thereby enhancing accuracy.

As a further feature of the invention, one or more of the pivots or rotary couplings are flexure pivots and particularly are in the form of connecting lengths or strips of solid material and the movement of the above-mentioned parallelogram occurs by virtue of flexure of these strips. The precise point of flexure is controlled by making the strips of material graduated uniformly in thickness, as by forming them of solid material left after making two closely spaced circular holes in a section of solid material such as e.g., one-half (½) inch aluminum plate stock.

In accordance with still another aspect of this invention a weighing system is constructed wherein the pivot supporting a weight balancing arm is a flexure pivot. In one form of this aspect of the invention there is sensed the variation in strain existing in the flexure pivot by one or more strain gauges as, by the application of items to be weighed, the balance arm moves through its usual arc. The electrical output or electrical characteristic of the strain gauge or gauges provides an indication of strain in the pivot versus applied stress represented by the arm deflection produced by the force or weight of the item or items to be weighed. Since it has been found that flexure pivots constructed of many metals, e.g., aluminum and other solid materials, retain their stress-strain characteristic with extended usage in this mode of operation, an extremely accurate and simple electromechanical weighing system is made possible.

A tare or tare plus other balancing weight, which may be adjustable, is attached to the opposite side of the balance arm. By this means all mechanical unbalances can be balanced out and weight and pressure measurements of high accuracy can be accomplished over a wide range of measurements.

As still another feature of the invention, a pressure meaurement or pressure calibration system is constructed in which a pressure piston-cylinder assembly is positioned to apply to the weight platform with applied weights a vertical force and particularly a vertical in-line force opposite to that applied by the weight platform, and thus, by taking into account the area of pressure loading of the piston, very precise weight or force as well as pressure read-outs can be obtained.

As still a further feature of the invention, weights are automatically applied to the weighing deadweight platform and are particularly chosen to give a complete range of weights in accordance with a 1-2-2-4 scale of weight values. In accordance with this system, for example, the first or lowest series of four weights would be .1, .2, .2, .4 pound, a second series would be 1, 2, 2, 4 pounds, and a third series would consist of 10-, 20-, 20-, 40-pound weights etc., thus permitting continuous weight selections in increments of one-tenth pound from one-tenth pound up as high as desired. Of course by adding a still lighter series of weights of .01, .02, .02, .04, a still wider range of selection and smaller increments of weights may be achieved.

As still a further of the invention the weights are automatically raised and lowered on the deadweight platform by an improved and simplified system of pressure actuated flexible tubes.

These and other features, objects and advantages of the invention will become more apparent from the following description when considered together with the drawings in which.

Figure 1:
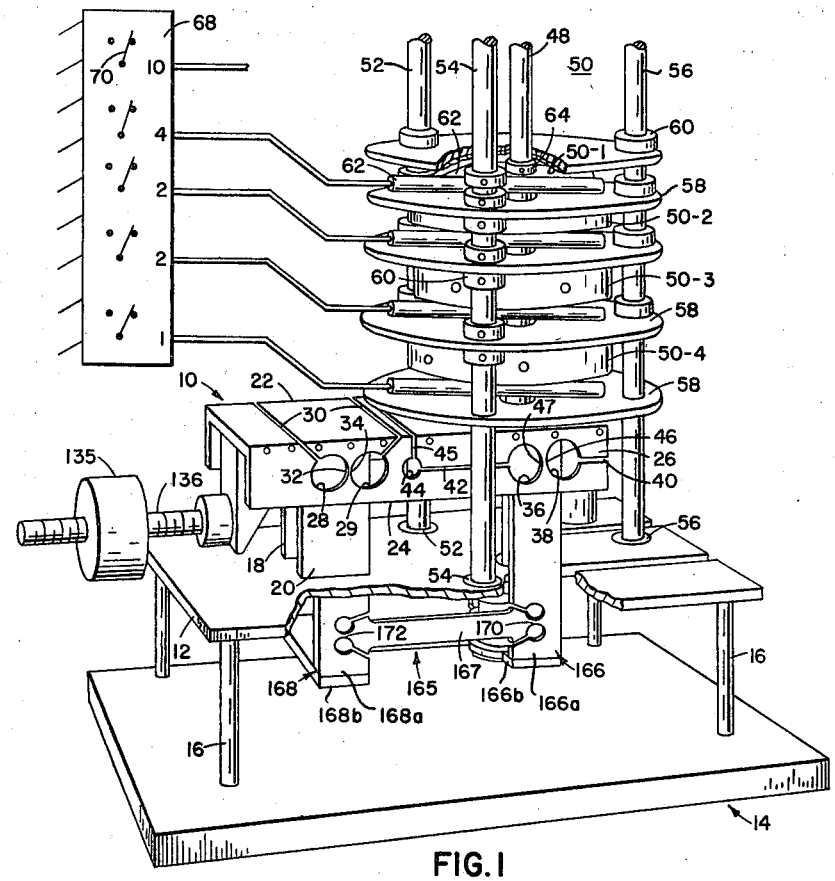
FIG. 1 is generally a perspective view of an apparatus embodying the invention with certain parts broken away and certain controls schematically represented for clarity.

Referring now to the drawings, the basic balancing arm-pivot assembly 10 of the invention is rigidly supported by and connected to the frame support table 12, in turn supported on base 14 by legs 16; and to table 12, by means of vertical support arms 18 and 20 there is rigidly connected the arm suspending pivot member 22. Balancing arm-pivot assembly 10 is constructed as a U-shaped channel, for example of one-half (½) inch aluminum plate. Several cuts are made in the channel to form a unique balancing system in which there are three sectors coupled solely by connections permitting only pivoting or rotary relative motion of limited angular travel, e.g., five degrees. These sectors are: the arm supporting pivot member 22, weight balancing arm member 24 and weight or deadweight platform 26. By virtue of pairs of circular cutout portions 28 and 29 made through both side walls of the channel and straight cutout portions 30, arm member 24 is suspended by and coupled to pivot member 22 on each side of the channel member by a respective length or a strip 32 of solid material remaining between circular cutout portions 28 and 29. Each such strip is thus graduated in thickness to a minimum thickness at a point midway along its length which is the pivot point 34 between arm suspending pivot member 22 and arm member 24. In this fashion a flexure pivot is formed to provide an improved weight balancing pivot. Upon the application of an unbalancing force to arm member 24, it pivots or rotates with respect to arm suspending pivot member 22 about an axis through such pivot points 34. This motion is permitted by the flexure or bending of strips 32 and the effect is to produce a natural balanced posture since the balanced position is the unbended position. And, since no bending force is applied to the strips when in a balanced position, the point at which readouts are made, no compensations need be made for flexure forces.

Deadweight platform supporting member or platform support 26 is similarly isolated from arm member 24 by adjacent circular cutout portions 36 and 38 and straight cutout portions 40 and 42 in each side of the channel member. In addition circular cut-out portion 44 in each side of the channel and straight cutout portion 45 complete a free path from circular cutouts 36 through straight cutout portions 42 to complete the isolation or desired degree of freedom for weight platform 26 with respect to balancing arm member 24. The lengths or strips 46 of solid material between circular cutout portions 36 and 38 suspend, apply a force to, or are neutral in these respects, in linking weight platform 26 to arm member 24, depending upon the existence of and direction of vertical force or forces applied to weight platform 26. It will be observed that although the weight coupling, right side of arm member 24, with respect to pivot or balance point 34, actually follows a circular path when deflected up or down, the deadweight platform supporting member 26, which pivots about an axis through pivot points 47 may be maintained or stabilized, in a manner to be described, to move in a true vertical line of direction only.

Figure 5:
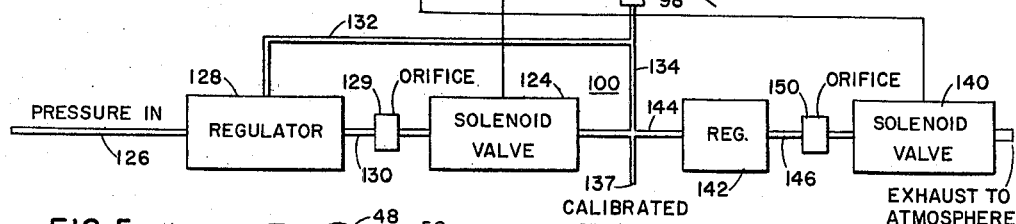
FIG. 5 is a fragmentary detail view of a weight supporting and shifting means.
Figure 5:
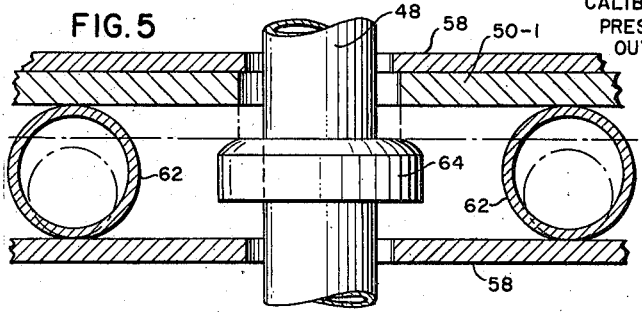

Deadweight column or spindle 48, to which weights or dead weights 50–1 to 50–4, representative of 1-, 2-, 2-, and 4-pound weights respectively, are selectively applied, is rigidly connected by bolts 51, 51 to platform 26. Deadweights are held off of spindle 48, except when used to apply weight to it, by means of weight application assembly 50 which is rigidly supported on table 12 by stanchions 52, 54, and 56. Weight supporting tiers 58 held by collar mounts 60 on stanchions 52, 54, and 56 provide support for expandable tube members 62 (see also FIG. 5). The latter in turn support the weights when they are not applied, that is, when they are held off of center collars 64; center collars 64 being rigidly attached to weight holding spindle 48. Pressure to tube members 62 is selectively released by weight selection control 68 in accordance with selector valve controls 70 to apply a selected total weight to collars 64 and thus to spindle 48. Tubular members 62 are in the form of a "Y" to apply a sufficiently balanced lifting force to the deadweights; but two parallel tubular members, one on each side of spindle 48, may be used to achieve the same results. Another system would employ a circular expandable bellows under each deadweight.

Coupled to the underside of spindle 48, and directly under the applied weights 50, is a hydraulic-cylinder piston assembly 71 (FIG. 2), the cylinder 72 of which is rigidly mounted by bolts 74 and 76 to table 12; while the driven piston rod 75 thereof is connected through a short rod 79 and thrust bearings 80 and 81 to platform 26. There is also provided a piston rotation assembly 78 which includes motor 82 having a stator 84 supported, by means not shown, to weight platform 26 and a rotor 86 driving through gears 88 and 90 the piston rod 75 and thus piston 92. By continual rotation of piston 92 frictional effects are minimized between piston 92 and the cylinder walls of cylinder insert member 94, providing the pressure seal for piston 92. Oil under pressure is supplied to chamber 96 of cylinder 72 in a manner to be described through connecting passageway 97 from pressurized oil reservoir 98 as a means of applying controlled fluid pressure from a pressurized fluid source represented by pressurized air supply line 126 in FIG. 3.

Figure 3:
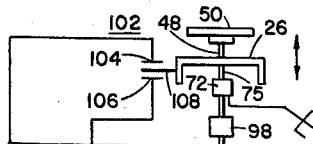
FIG. 3 is a combined electrical-fluid pressure diagram illustrating one embodiment of the invention.
Figure 2:
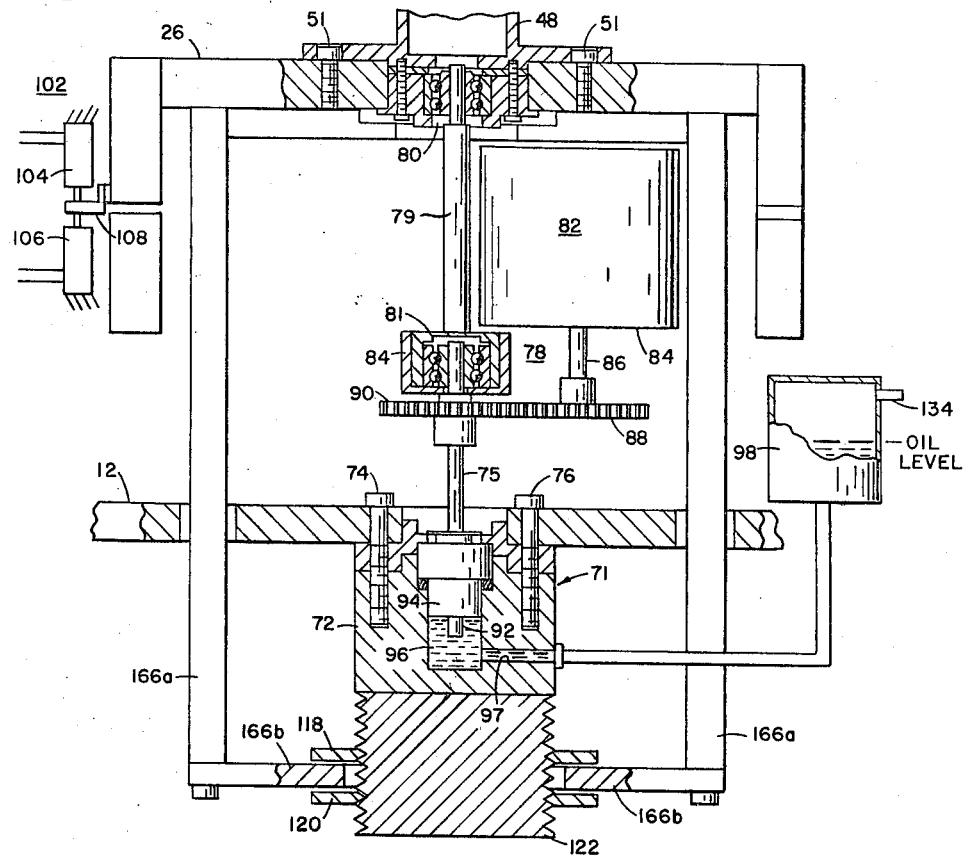
FIG. 2 is an elevation detail view of a portion of the apparatus shown in FIG. 1, and particularly illustrating a hydraulic coupling system between a frame of the apparatus and a weight or deadweight platform.

Referring now to FIG. 3, pressure, or the release of pressure, or changes in pressure are applied in response to the activation of switch assembly 102 which, as shown in FIG. 2, consists of microswitches 104 and 106. Assume, for example, that through the activation of valve or valves 70 of weight selection controls 68 a given weight or weights are applied to spindle 48 and thus to deadweight platform 26. The result is that the existing pressure applied by pressure supply system 100 to reservoir 98 and thus to cylinder 72 is insufficient to support platform member 26 and balancing arm member 24 in a balanced posture. Platform 26 thus moves downward causing contacting member 108 (FIG. 2) attached to platform 26 to close plunger operated switch 106. To prevent substantial and unnecessary downward or upward movement, on the bottom ends of elements 166a, 166a (of an arm 166 in the hereinafter described assembly 165) dependently attached to deadweight platform 26, there is rigidly secured a transverse joining element 166b, serving as a stop engaging plate positioned to travel between stop collars 118 and 120 threaded on and thereby adjustably yet rigidly attached to support member 122. Support member 122 is in turn rigidly attached to the underside of cylinder 72.

With the closing of switch 106, solenoid valve 124 (FIG. 3) is opened causing an increase in pressure to be coupled to chamber 96 of cylinder 72. This occurs as follows: a source of high pressure air, e.g. 6,000 p.s.i. is coupled from high pressure input line 126 through pressure regulator 128, orifice 129 in line 130, and supplied through line 144 to line 134 at a pressure differing from the pressure sensed by feedback pressure line 132 connected between pressure output line 134 and regulator 128 by a selected amount, e.g., 100 p.s.i. This serves to protect solenoid valve 124 from exceeding normal working pressures. Orifice 129 serves to reduce the rate of flow, particularly where small or reduced increments of pressure change are involved.

To further adjust the rate of flow in accordance with the demand for changes in pressure as dictated by application or removal of weights from spindle 48, switch assembly 102 may comprise a plurality of plunger-operated switches for each of switches 104 and 106, and each switch would sense and be closed by a different magnitude of departure from balance of balancing arm member 24. The different degrees of unbalance represented by the closing of the different switches would then operate one or more solenoid valves 124 in parallel to selectively adjust the rate of air flow. Each parallel air path thus created would then be provided with a desired size of orifice in accordance with the solenoid valve-switch combination with which it is associated. Thus, for example, where small degrees of unbalance occur a switch sensing slight movement of arm 108 would operate a solenoid valve with a quite small orifice and the assembly thus be returned to balance with a minimum tendency for over-shoot by arm member 24.

Upon application of increased air pressure to output line 134, in response to an increase in weight application to spindle 48 as described above, pressure is applied to oil reservoir 98 (FIG. 2) and increased hydraulic pressure is applied to the chamber of cylinder 72. This applies an upward force to piston 92 causing platform 26 to rise. When it rises sufficiently to cause a balanced condition of arm member 24, switch 106 opens and valve 124 closes cutting off further increase in pressure. At this point assuming mechanical unbalances including weight of hydraulic fluid having been balanced out by adjustable weight or tare balancing weight 135, suspended and threaded on balance arm extension 136 forming a part of arm member 24, the pressure at pressure outlet 137 would be equal to the deadweight applied to spindle 48 divided by the effective end area of piston 92. Outlet 137 thus provides a precisely known selected output pressure which is available for calibration of pressure indication or other pressure sensitive devices or for such other purposes as desired.

In the event that too much air is introduced causing spindle 48, platform 26 and arm member 24 to rise above the balanced position, or the weight load applied to spindle 48 is deliberately made less than the existing force applied to piston 92 switch 104, or a plurality of the switches 104 as described above, would be closed and solenoid valve 140 would open, exhausting into the atmosphere a volume of air sufficient to reduce pressure on line 134 to a pressure equal to the force required to balance the weights and return arm member 24 to a balanced position at which point switch 104 would open and prevent further such exhaust.

Regulator 142, thru which air is fed by line 144 and thence thru line 146 with orifice 150 to valve 140, serves to limit the pressure applied to solenoid valve 140 for the same purpose as described above for regulator 128. Valve 140 is operated by switch 104 in response to an indicated pressure excess and permits pressure on line 134 to be released to the atmosphere thru valve 140. A multiple switch 104-solenoid valve 140 combination would be employed in the same manner and in the same circumstances as described above with respect to multiple usage of switches 106 and valves 124, but here reacting to decreasing pressures.

Instead of using plunger-type switches for switches 104 and 106, as illustrated in FIGS. 2 and 3, fixed positioned reed relays, either single or multiple units, may be operated by magnets held by platform 26 or elsewhere mounted on or coupled to a moveable portion of balancing arm member 24. Another approach would be to employ photoelectric switches in place of the reed relays.

Figure 4:
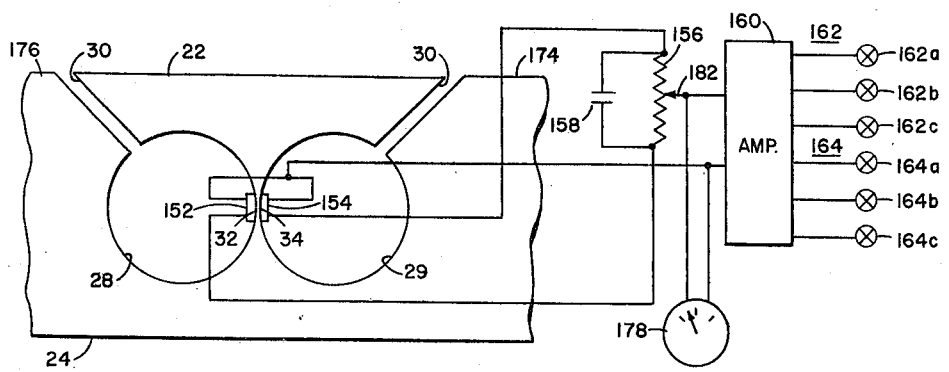
FIG. 4 is a schematic illustration of a means of reading out weights and controlling valves for precise pressure generation.

Still another method of performing this desired switching function is illustrated in FIG. 4 wherein strain-gauges 152 and 154 are mounted at the point of flexure between circular cut-out portions 28 and 29 of balancing arm-pivot assembly 10. Strain gauges 152 and 154 are connected in series across potentiometer 156 and power source 158 and thus provide an input to amplifier 160 which is a polarity function of the direction of flexure of pivot 34 and magnitude function of the magnitude of flexure. This flexure, of course, is an indication of unbalance in the same fashion as that indicated by arm 108 attached to dead-weight supporting platform member 26. Amplifier 160 includes polarity and level sensing means for (1) selectively energizing pressure increase values 162a–c or pressure decrease valves 164a–c, depending upon the direction of flexure, and (2) magnitude sensing, for activating the fast, medium, or slow output, a, b or c valves respectively, of valves 162a–c or 164a–c. One method of level sensing is by means of an optical meter relay which provides selective switching as a function of magnitude and polarity of an input voltage. Such devices are generally available and well-known to those skilled in the art. Alternately, the output of amplifier 160 would control proportionally, as a function of polarity, a single proportional "pressure increase" valve or a single proportional "decrease" valve, and, as a function of magnitude, the degree of opening of the particular valve being operated.

As still another variation of the control system, a differential transformer would be coupled to sense the position of balancing arm member 24; and by means of conventional circuitry, as for example by means of a balanced modulator, an input to amplifier 160 would be presented which is a polarity function of unbalance in one direction or the other and a magnitude function of the extent of position unbalance.

For several reasons it is important that spindle 48 be maintained vertical during operation. First, spindle 48 must not tilt to a point where it would engage stationary weight supporting tiers 58 and thus interfere with the balancing movement of balancing arm member 24. Second, if spindle 48 is tilted, the effective distance between the center of force of weights applied to the column would change as a function of the tilt and tend to introduce instability into the system and decrease the rate of balance attainment, since the effective weight as a balancing force would not remain constant as weight balancing arm 24 moves toward or through its balanced position. Third, it is important to maintain cylinder-piston assembly 71 in a stable and rigidly fixed position in order to precisely apply a known force against platform 26. Any departure from vertical introduces errors in that the applied force would have, in addition to the weight lifting vertical component, a non-lifting horizontal component.

Stabilization of weight platform 26 in a vertical as described is accomplished by means of stabilization assembly 165 consisting of vertical linkage arm 166, horizontal linkage arm 167, and base-connected arm 168. These three arms, like the arms in assembly 10, are composite in the sense of comprising each a pair of spaced like parallel elements. Thus at each side a respective continuous piece of solid material, such as aluminum plate having thickness on the order of one-half (½) inch is appropriately cut out to a generally U-shape, each to provide in an integral structure an element of each of the three arms, namely respective vertical elements 166a, 168a of the arms 166 and 168 and one horizontal element of arm 167; with the elements of arms 166 and 167 being connected by a horizontal flexure pivot 170 and those of arms 167 and 168 being connected by horizontal flexure pivot 172. These pivots are of the type described above between pivot member 22 and weight balancing arm member 24, except that they are horizontal instead of vertical. These vertical elements 168a, as previously described, are connected at the bottom by a separate transverse joining piece 168b, and similarly the vertical element 166a by the joining piece 166b. Stabilization assembly 165, as viewed from the side, is basically of a U-shaped configuration with one leg end, an upper end of arm 166, rigidly attached to platform member 26 and the other leg end, the upper end of arm 168, rigidly attached to support table 12. Stabilization assembly 165 together with supporting arms 18 and 20 and the linkage provided by arm-pivot assembly 10 between pivot points 34 and 47 form a parallelogram stabilized for restricting the motion of platform 26 and column 48 to a vertical line of direction; and, together with appropriate adjustment of tare balancing weight 135, this combination stabilizes balancing arm-pivot assembly 10 in a balanced posture generally. This, of course, requires that the length of opposite effective arms in the parallelogram be equal. Thus, for example, the total distance, between the axes through pivots 172 and pivots 34 as provided by arm 168 and arms 18 and 20, equals the distance between the pivot 170 and pivot 47. While only one side of stabilization assembly 165 is showing, a like arrangement exists on the opposite or back side of the apparatus.

In order to assist in preventing piston binding in the event of slight misalignment between cylinder-piston assembly 71 and platform 26, bearing assemblies 80 and 81 are of the self-aligning type.

The control system, illustrated by FIG. 4 and thus far described as a means of controlling pressure increase valves 162 and pressure decrease valves 164 for use in the generation of precisely determined pressures, also comprises the basic elements of a weighing or force measurement system. The control voltages which are fed to the input of amplifier 160 are representative of the angular orientation of balance arm member 24 with respect to pivot member 22 as measured by the strain detected by strain gauges 152 and 154. Deflection of arm member 24 is produced by applying an unbalancing force to balance arm member 24 as by applying an upward or downward force to either the right side 174 or left side 176. It will be readily seen that we have thus constructed the basic unit for an electrical weighing, pressure or other force measurement scale wherein an item to be weighed, for example, would be supported on the right side 174 and partial counterbalancing weights would be applied to the left side 176. The electrical readout which, as illustrated, is in the form of a potentiometer type meter 178 is connected to the same electrical terminals as the input of amplifier 160. While the flexure of pivot 34 and thus the angular travel of the balance arm must be limited to a few degrees resulting in a limited range of measurements, with one counter-balance setting, the overall range of operation may be extended over a wide range by counterweight adjustment as by turning counterweight 135 on threaded support 136 as shown in FIG. 1.

As an illustration of operation of this embodiment of the invention, assume that weight 135 is of such weight and position on balance arm etxension 136 as to position weight balancing arm member 24 in a tilted or unbalanced position downward to the left, to the extent that the right side of balancing arm member 24 rises to a point wherein collar plate 166b, connected to platform member 26, is just about but not quite touching collar 118, or slot 30 is nearly but not quite closed due to this posture. This adjustment is made with no weights or objects to be weighed applied to the right side 174 of balancing arm member 24. At this point potentiometer type meter 178 would be adjusted as by means of moveable arm 182 to indicate a zero weight condition. Then with the application of the object to be weighed to the right side of balancing arm member 24 as by means of a platform connected thereto such as platform 26 (FIG. 2), the right side of balancing arm member 24 will be deflected downward causing a clockwise rotation to occur about flexure pivot 34. The magnitude of this rotation is dependent upon the weight or force applied and the electrical output registered by potentiometer 156 is an indication of this weight or force. By appropriate calibration of potentiometer 156 in terms of the weight and position of counterweight 135, a very precise electrical readout of weight or other force measurement may be achieved on meter 178.

For weight measurements there would be no coupling of cylinder-piston assembly 71 to platform 26 nor coupling of platform 26 as described to balancing arm member 24. Typically, platform 26 and stabilization assembly 165 would be omitted and a weighing platform attached directly to the right side 174 of arm member 24. Also, in this form of the invention, amplifier 160, valves 162 and valves 164 as well as hydraulic-cylinder-piston assembly 71 would not be employed. Pressure measurements would typically involve adjusting deadweight selections and the position of counterweight 135 to position arm member 24 for the correct anticipated range of operation.

In the aforegoing specification and in the claims, the phraseology "movement in a vertical line of direction" is used for brevity of description which is to be understood as signifying that the line of action of or line of force application by the deadweight platform on the balance arm is maintained always vertical, though, of course, such vertical line shifts in space through an infinitude of parallel line positions with balance arm deflections.

We claim:
1. A vertical force measuring system comprising:
 (A) balancing arm means having first and second arm sections;
 (B) a fixedly mounted flexure pivot for supporting said balancing arm means at a pivot axis between said first and second arm sections for rotation of said balancing arm means about said pivot;
 (C) a vertical force receiving means connected to said first arm section;
 (D) said second arm section of said balancing arm means including means for providing counterbalancing weight;
 (E) electromechanical means responsive to position of said balancing arm means for providing an electrical output characteristic which varies as a function of deflection of said balancing arm means; said electromechanical means comprising at least one strain gauge secured on and responding to flexing of said flexure pivot for providing said electrical output characteristic; and
 (F) indicating means responsive to the output of said electromechanical means for indicating the deflection of said balancing arm means.

2. A deadweight balance measurement system comprising:
 balancing arm means having first and second arm sections;
 fixedly mounted pivot means for supporting said balancing arm means at a point between said first and second arm sections;
 deadweight supporting means;
 means for providing a pivotal connection between said deadweight supporting means and said first arm section of said balancing arm means;
 means for stabilizing said deadweight supporting means for movement solely in a vertical line of direction; and
 means for applying a force to be measured to one of said arm sections of said balancing arm means, said force tending to rotate said balancing arm means in a direction opposite to the direction of rotation tending to be produced by a deadweight applied to said deadweight supporting means;

said deadweight supporting means including a vertically mounted weight element supporting means adapted to support a plurality of weight elements and further comprising:

fixed supporting means for independently supporting a plurality of weight elements; and means supported by said fixed supporting means for selectively applying and removing weight elements from said vertically mounted weight element supporting means, and comprising a fixed platform associated with each said weight element and a fluid driven expansible member supported by each said fixed platform and being adapted to support a said weight element on said fixed platform when fluid pressure is applied to said fluid driven expansible member and to apply the said weight element to said deadweight supporting means when said fluid pressure is released.

3. The deadweight balance measurement system set forth in claim 2 wherein said pivot means comprises a flexure pivot.

4. A deadweight balance measurement system as set forth in claim 2 further comprising a plurality of at least four said weight elements and wherein the mass of at least four of said weight elements follow a 1-2-2-4 scale of relative weight element values.

5. A deadweight balance measurement system comprising:
 (A) balancing arm means having first and second arm sections;
 (B) fixedly mounted pivot means for supporting said balancing arm means at an axis of pivoting between said first and second arm sections;
 (C) deadweight supporting means;
 (D) pivotal connection means between said deadweight supporting means and said first arm section of said balancing arm means;
 (E) means for stabilizing said deadweight supporting means during movement in a vertical line of direction comprising:
  (1) a fixed support,
  (2) vertical first and horizontal second moveable arms,
  (3) a rigid connection of one end of said first moveable arm to said deadweight supporting means,
  (4) a first pivotal connection of one end of said second moveable arm to said fixed support,
  (5) a second pivotal connection of the other, otherwise free, ends of said first and second arms to each other,
  (6) the pivot axis of said first pivotal connection being positioned vertically a distance, from said axis of pivoting between said balancing arm means and said pivot means, equal to the distance between the pivot axis of said pivotal connection means and said second pivotal connection, and
  (7) the pivot axis of said first pivotal connection being positioned a distance from said second pivotal connection equal to the distance between said axis of pivoting and said pivotal connection means;
 (F) said second arm section of said balancing arm means including balancing tare weight means; and
 (G) means for applying a force to be measured to one of said arm sections of said balancing arm means, said force tending to rotate said balancing arm means in a direction opposite to the direction of rotation tending to be produced by a deadweight applied to said deadweight supporting means; said means for applying force comprising a vertically acting fluid pressure cylinder-piston assembly connected between a fixed base and said deadweight supporting means to apply the said force to said first arm section of said balancing arm means.

6. The deadweight balance measurement system set forth in claim 5 wherein:
at least one of said first and second pivotal connections and said pivot means comprises a flexure pivot, said flexure pivot comprising the solid material between adjacent but non-intersecting circular holes in solid material.

7. The deadweight balance measurement system set forth in claim 5 further comprising:
 (A) a source of fluid under pressure;
 (B) control means connecting said source and said fluid pressure cylinder-piston assembly and including means responsive to the balance, unbalance and direction of unbalance of said balancing arm means for applying, holding, and releasing fluid pressure applied to said cylinder-piston assembly, and thereby maintaining said fluid pressure at a value determined by a deadweight applied to said deadweight supporting means.

8. The deadweight balance measurement system set forth in claim 7 wherein said control means comprises:
 (A) signal initiation means responsive to the position of said balancing arm means for developing control signals;
 (B) first solenoid valve means providing controlled fluid coupling between said source of fluid under pressure and said cylinder-piston assembly responsive to said control signals; and
 (C) second solenoid valve means providing controlled fluid venting-coupling between said cylinder-piston assembly and the atmosphere responsive to said control signals.

9. The deadweight balance measurement system set forth in claim 8 wherein said signal initiation means comprises at least two electrical switching means, respectively connected to said first and second solenoid valve means.

10. The deadweight balance measurement system set forth in claim 9 wherein:
 (A) each said switching means comprises a plurality of electrical switches, each said switch of said plurality being responsive to a different magnitude of unbalance of said balancing arm means; and
 (B) each of said first and second solenoid valve means comprises a like said plurality of solenoid valves and wherein a single said electrical switch controls at least one different solenoid valve than any other said electrical switch.

11. The deadweight balance measurement system set forth in claim 9 wherein:
 (A) said signal initiation means comprises means for developing an electrical signal which is a polarity function of the direction of unbalance of said balancing arm means and a magnitude function of the magnitude of unbalance of said balancing arm means; and
 (B) said first solenoid valve means is responsive to signals of one polarity and second solenoid valve means is responsive to signals of the opposite polarity.

12. The deadweight balance measurement system set forth in claim 11 wherein:
 (A) each of said solenoid valve means comprises a plurality of solenoid valves and each said valve includes means for permitting a discrete rate of flow when open; and
 (B) electrical coupling means connecting said electrical signal initiation means to said solenoid valves for operating valves of said solenoid valve means to produce the total said rate of flow through at least one of said valves which is a function of the magnitude of said electrical signal.

(References on following page)

References Cited

UNITED STATES PATENTS

| | | | |
|---|---|---|---|
| 3,240,281 | 3/1966 | Schaevitz | 177—190 X |
| 2,407,513 | 9/1946 | Pounds | 177—210 X |
| 3,123,164 | 3/1964 | Echenique et al. | 177—210 X |
| 3,246,512 | 4/1966 | Gyllenberg | 177—246 X |
| 3,425,502 | 2/1969 | Shapland | 177—171 |
| 3,148,742 | 9/1964 | Giulie. | |
| 3,177,958 | 4/1965 | Link | 177—208 |
| 3,179,192 | 4/1965 | Link | 177—208 |
| 3,215,217 | 11/1965 | Landvater | 177—248 |
| 3,339,650 | 9/1967 | Carr | 177—254 X |

RICHARD B. WILKINSON, Primary Examiner

G. H. MILLER, JR., Assistant Examiner

U.S. Cl. X.R.

177—208, 211, 248